Sept. 6, 1927.
R. B. McCORMICK
1,641,859
AXLE TRANSMISSION
Filed Aug. 23, 1926
2 Sheets-Sheet 1
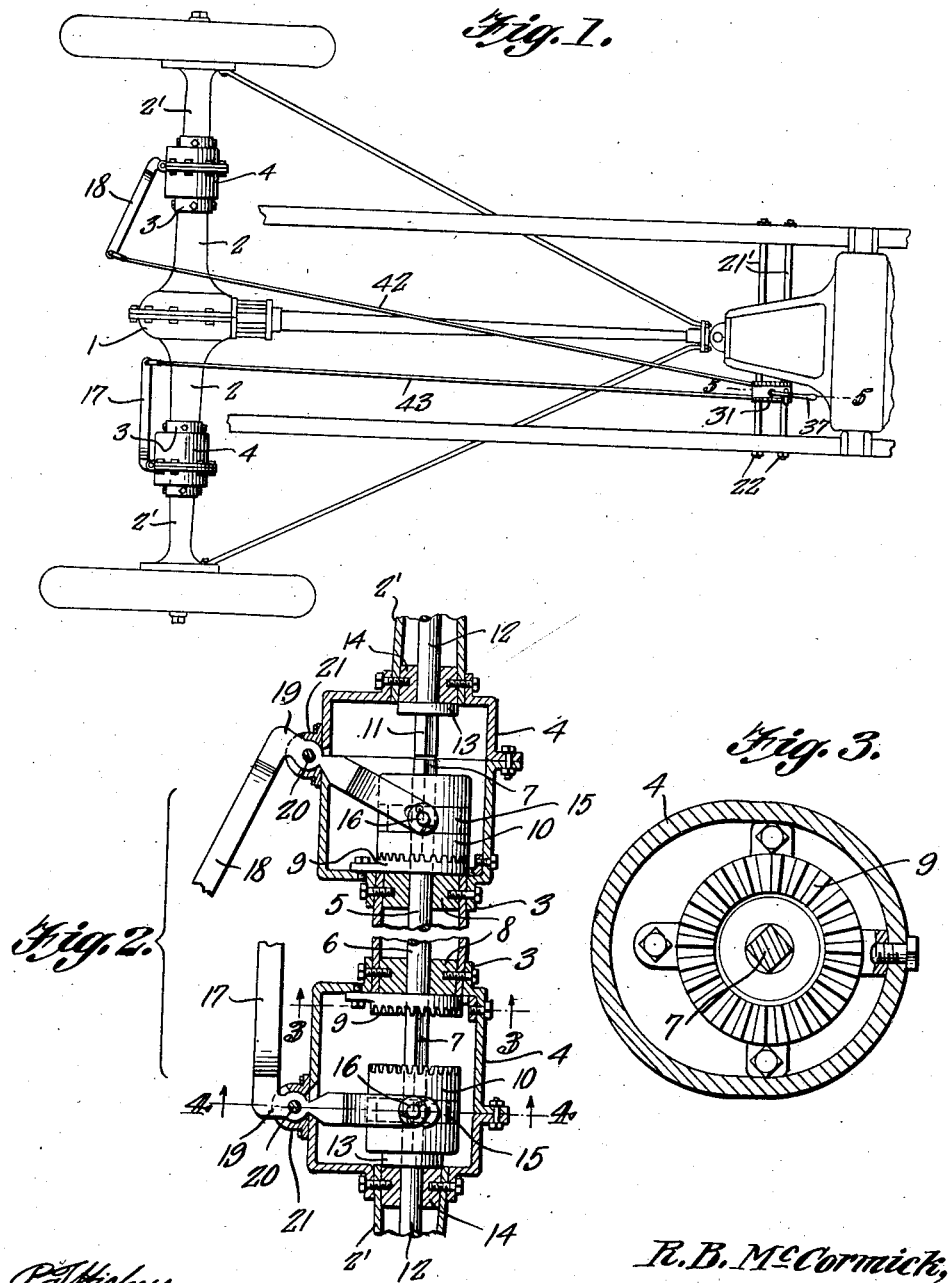

Sept. 6, 1927.  R. B. McCORMICK  1,641,859
AXLE TRANSMISSION
Filed Aug. 23, 1926   2 Sheets-Sheet 2
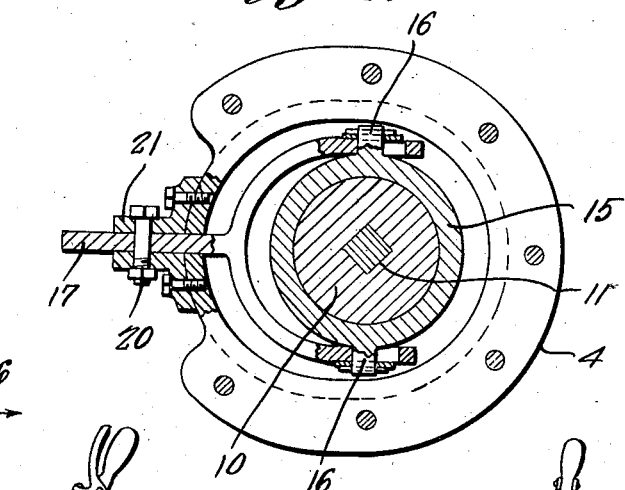
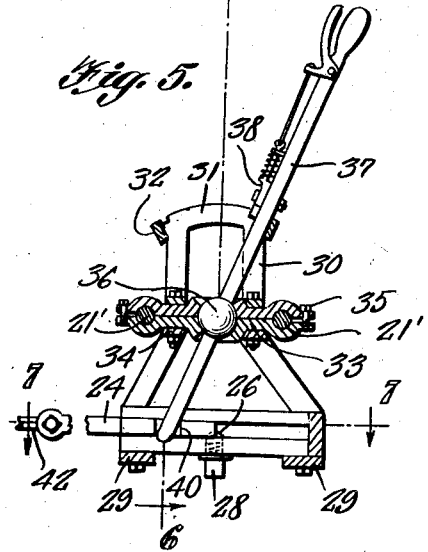
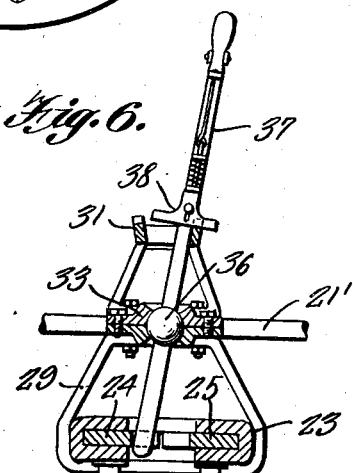
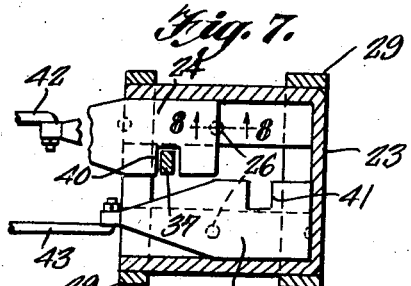
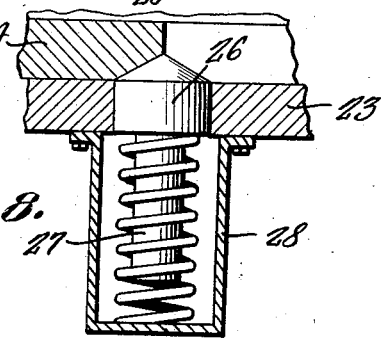
R. B. McCormick,
INVENTOR
BY Victor J. Evans
ATTORNEY Patented Sept. 6, 1927.

1,641,859

UNITED STATES PATENT OFFICE.

ROBERT BRUCE McCORMICK, OF DETROIT, MICHIGAN.

AXLE TRANSMISSION.

Application filed August 23, 1926. Serial No. 131,073.

My present invention has reference to automobiles and has for its object to provide a means whereby the rear axle drive shafts may be clutched to or disconnected from the wheels driven thereby, so that a vehicle having one wheel mired, can have all of the engine power directed thereto, or as when a wheel is spinning, without propelling the machine, all of the power of the engine may be directed to the second wheel, so that the vehicle can be propelled through ruts and under all road conditions.

A further object is the provision of a power transmission for the drive wheels of automobiles or similar vehicles, wherein a single lever is employed for operating the clutch between sectional rear axle shafts in an easy and positive manner.

To the attainment of the foregoing, the invention consists in the improvement as herein described and definitely claimed.

In the drawings:—

Figure 1 is a top plan view of a sufficient portion of an automobile frame to illustrate the application of my improvement thereon.

Figure 2 is an approximately central horizontal sectional view through the rear axle housing of the automobile, the differential housing being omitted.

Figure 3 is a sectional view on the line 3—3 of Figure 2.

Figure 4 is a sectional view on the line 4—4 of Figure 2.

Figure 5 is a sectional view approximately on the line 5—5 of Figure 1.

Figure 6 is a sectional view on the line 6—6 of Figure 5.

Figure 7 is a sectional view on the line 7—7 of Figure 5.

Figure 8 is a detail sectional view approximately on the line 8—8 of Figure 7.

In carrying out my invention, the drive shaft of the engine for an automobile or the like carries on its outer end the usual drive pinion associated with the ordinary differential gears in the usual differential housing 1. The axle housings 2—2, which project in opposite directions from the differential housing 1, are, however, cut away and shortened. Connected to the sections of the said axle housings there are the reduced and outwardly flanged ends 3 of two-part casings 4. The confronting ends of the casings 4 are flanged, and these flanges are bolted together as disclosed by the drawings. For distinction, the rear axles, driven by the differential which derives power from the engine drive shaft, are indicated by the numerals 5 and 6, respectively. Each shaft 5 and 6 is received in the respective casings 4, the portions of the shafts received in the said casings being squared in cross section, as indicated by the numerals 7. Between the axle housing sections and the casings 4 there are arranged inner blocks 8 which provide bearings for the said shaft sections 5 and 6, and contacting with these blocks 8 there are, in the respective housings, toothed clutch wheels 9. The shafts 5 and 6 pass freely through the center of the said clutch wheels 9, and the wheels are provided with peripheral ears that receive therethrough bolts that secure the said clutch wheels in the said casings.

Slidable on the squared ends 7 of each of the shafts 5 and 6 there are clutch members 10 having their inner faces toothed, to engage with the teeth of the clutch wheels 9. The bores of the clutch members 10 are square to correspond to the shape of the ends 7 of the shafts 5 and 6. The squared ends 7 of the shafts 5 and 6 are in direct alignment with the squared ends 11 of the outer sections 12. The axle sections 12, at the terminal of their square extensions 11, are formed with flanges 13 that abut against blocks 14 arranged in the bores at the inner ends of the outer sections 2' of the rear axle housings. The blocks 14 also provide bearings for the shaft sections 12. Each of the slidable clutch members 10 is preferably round in cross section and is centrally formed with an annular depression in which there is received a band 15. Pivotally connected, as at 16, to the opposite sides of the bands 15, there are the forked arms on the inner angle ends of the levers 17 and 18, respectively. The levers at their angle ends 19 are pivotally secured, as at 20, in boxes 21 provided on the outer sides of the casings, 4.

As far as the description has progressed it will be noted that when the lever 18 is swung to the position illustrated in Figure 2 of the drawings, the shaft section 5 will be held against turning, and when the lever 17 has been turned to the position also illustrated in Figure 2 of the drawings, the clutch element 10 is brought out of engagement with the clutch element 9, and has ridden onto the squared end 11 of the outer shaft section 12, so that the wheel connected with this section will revolve and will have full engine force to impel the said wheel.

As disclosed by Figure 1 of the drawings, I arrange beneath the transmission housing of the engine a pair of spaced bars 21' which pass through the channeled side bar of the chassis and have screwed on their ends nuts 22. These bars provide a support for a hollow member 23 provided with suitable guide flanges for slidable blocks 24 and 25, respectively. The under faces of the blocks have conical depressions as have the ends thereof, and these depressions are designed to receive therein the cone-shaped heads 26 of spring influenced plunger members 27 which are suitably housed, as at 28, in the bottom of the member 23. The member 23 may be in the nature of a frame having cross sectionally U-shaped sides, a connecting flange at the rear thereof and an open front. Secured to the base of the member 23, at the ends thereof, there are transverse bars 29 whose ends are flanged upwardly against the sides of the said member 23 and from thence continued inwardly and merge into straight arms 30, which are connected by segmental plates 31. The ends of the opposed plates 31 are connected together by flanges 32. I have stated that the member 23 is supported by the rods 21', but the said rods are not directly connected to the member 23, but pass through bearing openings adjacent to the ends of plates 33 which are riveted, bolted, or otherwise secured between transverse connecting elements 34 for the arms 30. The upper and lower plates 33 have their ends connected by bolts 35, and the said plates are likewise bolted on the brace or connecting members 34. The plates 33 at the center thereof have aligning concaved depressions for the reception of a ball 36 formed on a shift lever 37. The shift lever carries a handle operated spring influenced dog 38 to engage in notches 39 in the segmental plates 31. The slidable members 24 and 25 have their confronting edges formed with notches 40 and 41 respectively, and within one of these notches the lower end of the shift lever 37 is received. The outer ends of the slidable blocks 24 and 25 have pivotally connected thereto the offset ends of shift rods 42 and 43, respectively. The rod 42 is connected to the angle lever 18, and the rod 43 to the angle lever 17. The spring influenced plungers hold the slidable blocks 24 and 25 against accidental movement. The shift lever 37, as previously stated, has its lower end received in one of the notches 40 or 41 in the blocks 24 or 25. When it is desired to hold the axle section 5 and its extension 12 from turning by the drive shaft of the engine, the shift lever is operated to move the block 24 to the positions disclosed in Figures 5 and 6 of the drawings. When the shaft sections 5 and 12 are to be again connected the shift lever is operated to move the slidable block 24 in and against the inner wall of the member or housing 23. This will bring the slot or notch 39 in alignment with the slot or notch 41 so that the shift lever may be turned to bring its end in the notch 41 and move the slide outwardly through the member 23 to cause the rod 43 to swing the lever 17 to clutch the shaft section 6 with its shaft extension which is secured to the wheel.

It will thus be noted that the control for the clutches is arranged conveniently with respect to the driver and may be readily operated as occasion requires.

The simplicity of the construction and the advantages thereof, will, it is thought be apparent to those skilled in the art to which such invention relates, but the nature of the invention is such as to render the same susceptible to changes in construction, proportion and material employed, etc. Therefore, it is to be understood that I am to be restricted only to the improvement as defined by the appended claims.

Having described the invention, I claim:—

1. The combination with an automobile, including the engine driven shaft, the differential associated therewith, and the housing for the differential, the rear axle shafts and the housings for said shafts and in which the axle shafts and the housings therefor are constructed in sections, said shaft sections having their confronting ends squared in cross section, casings connecting the housing sections, a fixed toothed clutch block on the inner face of each casing and through which the inner axle shafts are journaled, a slidable clutch member in each casing having a square bore to engage with the squared ends of the axle shafts, angle levers having forked ends pivotally secured to the casings, said slidable clutch members having annular depressions, a band in each depression to which the forked ends of the angle levers are connected, a rod secured to the outer end of each of the angle levers, slidable members supported at the front of the automobile and to which the rods are respectively connected, spring influenced means for normally holding the slidable means from movement and a shift lever for actuating the slidable means, for the purpose set forth.

2. The combination with an automobile including the engine driven shaft, the differential associated therewith, and the housing for the differential, the rear axle shafts and the housings for said shafts and in which the axle shafts and the housings therefor are constructed in sections, said shaft sections having their confronting ends squared in cross section, casings connecting the housing sections, a fixed toothed clutch block on the inner face of each casing and through which the inner axle shafts are journaled, a slidable clutch member in each casing having a square bore to engage with the squared ends of the axle shafts, angle levers having forked ends pivotally secured to the casings, said slidable clutch members having annular depressions, a band in each depression to which the forked ends of the angle levers are connected, and supports secured to the automobile frame below the rear of the engine therefor, sectional plates on the supports, a frame having upper arched sides which are notched, secured to the plates, a hollow member supported on the lower end of the frame and slidable notched blocks in the hollow member to which the mentioned rods are respectively connected, spring influenced plungers engaging the blocks for holding the same from movement, a shift lever having a spherical portion journaled centrally in the plates and having its lower end received in the notch of one of the slidable blocks movable, when the said block is slid to its limit in one direction, into the notch of the adjacent block, and a spring influenced handle operated dog on the lever engageable in the notches in the arched upper sides of the frame, for the purpose set forth.

In testimony whereof I affix my signature.

ROBERT BRUCE McCORMICK.